United States Patent
Bareket et al.

(10) Patent No.: US 10,169,204 B2
(45) Date of Patent: *Jan. 1, 2019

(54) REAL-TIME USAGE CHECKING OF DYNAMICALLY GENERATED PROGRAM OUTPUT

(71) Applicant: International Business Machines Corporation, Armonk, NY (US)

(72) Inventors: Amit Bareket, Yavne (IL); Daniel Lereya, Tel Aviv (IL); Tamir Riechberg, Hod-HaSharon (IL); Moshe Weiss, Petah Tiqwa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,444

(22) Filed: Jul. 26, 2016

(65) Prior Publication Data
US 2016/0321161 A1   Nov. 3, 2016

Related U.S. Application Data

(63) Continuation of application No. 14/493,450, filed on Sep. 23, 2014, now Pat. No. 9,514,032.

(51) Int. Cl.
*G06F 11/00* (2006.01)
*G06F 11/36* (2006.01)

(52) U.S. Cl.
CPC ........ *G06F 11/3664* (2013.01); *G06F 11/362* (2013.01); *G06F 11/3624* (2013.01)

(58) Field of Classification Search
USPC ..................................... 714/25, 45
See application file for complete search history.

(56) References Cited

U.S. PATENT DOCUMENTS

| | | |
|---|---|---|
| 7,290,245 B2 | 10/2007 | Skjolsvold |
| 7,296,019 B1 | 11/2007 | Chandrasekar et al. |
| 7,401,293 B2 | 7/2008 | Symmes |
| 8,082,498 B2 | 12/2011 | Salamon et al. |
| 8,321,786 B2 | 11/2012 | Lunati |
| 9,002,700 B2 | 4/2015 | Hoover et al. |
| 9,514,032 B2 | 12/2016 | Bareket et al. |
| 2002/0078106 A1 | 6/2002 | Carew et al. |
| 2003/0084041 A1* | 5/2003 | Dettinger ................. G06F 8/34 |
| 2003/0177411 A1* | 9/2003 | Dinker ............... G06F 11/2028 714/13 |
| 2003/0226131 A1 | 12/2003 | Li |

(Continued)

OTHER PUBLICATIONS

"Best way to incorporate spell checkers with a build process", Stack Overflow, publication date Sep. 3, 2008-Oct. 9, 2012, 3 pages.

(Continued)

*Primary Examiner* — Sarai E Butler
(74) *Attorney, Agent, or Firm* — David B. Woycechowsky

(57) ABSTRACT

Receive output dynamically generated by a running program and check that output for spelling, grammar, and/or other usage errors, providing notice to a user of any errors found. The dynamically generated output includes an assembly of component parts not statically assigned in a predetermined configuration or with predetermined content, but rather generated and/or configured by the executing program as it runs.

1 Claim, 6 Drawing Sheets

(56) References Cited

U.S. PATENT DOCUMENTS

| | | | |
|---|---|---|---|
| 2006/0253837 A1* | 11/2006 | Hudson | G06F 11/3636 |
| | | | 717/124 |
| 2008/0162652 A1* | 7/2008 | True | G06Q 10/107 |
| | | | 709/206 |
| 2008/0254437 A1 | 10/2008 | Heffernan et al. | |
| 2008/0288532 A1 | 11/2008 | Aboukrat et al. | |
| 2008/0299532 A1 | 12/2008 | Edgar | |
| 2010/0005344 A1 | 1/2010 | Gyles et al. | |
| 2010/0275118 A1 | 10/2010 | Iakobashvili et al. | |
| 2011/0239111 A1 | 9/2011 | Grover | |
| 2012/0005291 A1 | 1/2012 | True et al. | |
| 2012/0011192 A1 | 1/2012 | Meister et al. | |
| 2012/0233107 A1 | 9/2012 | Roesch et al. | |
| 2012/0331333 A1 | 12/2012 | Imaki | |
| 2013/0061139 A1 | 3/2013 | Mahkovec et al. | |
| 2014/0143600 A1 | 5/2014 | Hutner et al. | |
| 2014/0218299 A1 | 8/2014 | Kataoka et al. | |
| 2016/0062816 A1 | 3/2016 | Ivanova et al. | |

OTHER PUBLICATIONS

Duan et al., "Online Spelling Correction for Query Completion", WWW 2011, Mar. 28-Apr. 1, 2011, Hyderabad, India, ACM 978-1-4503-0632—Apr. 11, 2003.

IBM et al., "A method for handling typing errors in Instant Messaging sessions", An IP.com Prior Art Database Technical Disclosure, Original Publication Date: Aug. 17, 2004, IP.com Number. IPCOM000030469D, IP.com Electronic Publication: Aug. 17, 2004, pp. 1-2.

Seth et al., "SSCS: A Smart Spell Checker System Implementation Using Adaptive Software Architecture", IWSAS 2001, LNCS 2614, pp. 187-197, 2003, © Springer-Verlag Berlin Heidelberg 2003, pp. 187-197.

Appendix P—List of IBM Patents or Patent Applications Treated as Related, Filed Feb. 9, 2017, 2 pages.

\* cited by examiner

REAL-TIME USAGE CHECKING OF DYNAMICALLY GENERATED PROGRAM OUTPUT

BACKGROUND OF THE INVENTION

The present invention relates generally to the field of software quality assurance, and also to automated spelling and grammar checking.

The field of software quality assurance (SQA) is concerned with monitoring software engineering processes to ensure the quality of the final software product or service. SQA encompasses the entire software development process, which includes processes such as requirements definition, software design, coding, source code control, code reviews, software configuration management, testing, release management, and product integration.

Software testing is an aspect of SQA undertaken to provide direct feedback on the quality of the software product or service itself (as opposed to the processes used in its development). Testing may include automated, semi-automated, and/or manual elements, and may be performed at various stages/scopes of development, such as at the component level (unit testing), sub-system level (integration testing), and system level (system testing), as well as at delivery time (acceptance testing). It may cover many dimensions of software quality, including functional correctness, completeness, stability, compatibility, scalability, usability, and/or security. Although software testing is as old as software itself, it remains a formidable challenge, both because some aspects of software quality are subjective and because exhaustive testing for even a relatively simple software product is typically infeasible.

Numerous types of automated usage checkers exist to aid users in producing well-formed language constructs. Among the most well known are the automated spelling and grammar checkers that have come bundled with popular word processing software packages for about the past two decades or so. These tools flag words and phrases that may contain spelling and/or grammar errors, and typically also attempt to provide high-probability alternatives for the intended word or expression. A basic spell checker may simply extract words from a file and match them against entries in a reference list, while more sophisticated varieties may perform morphological and context-sensitive analyses that not only determine if there is a match for a given word in the lexicon but also if it is the correct word and word form for the context in which it is used. Grammar checkers similarly fall along a spectrum of sophistication, and both types of products will likely continue to evolve.

SUMMARY

According to an aspect of the present invention, there is a method, computer program product and/or system that performs the following steps (not necessarily in the following order): receives output dynamically generated by an executing program; checks the output for one or more usage errors; and responsive to detection of at least one usage error, provides notice of the error to a user. The checked output includes an assembly of component parts generated and/or configured by the executing program as it runs.

DETAILED DESCRIPTION

Figure 1:
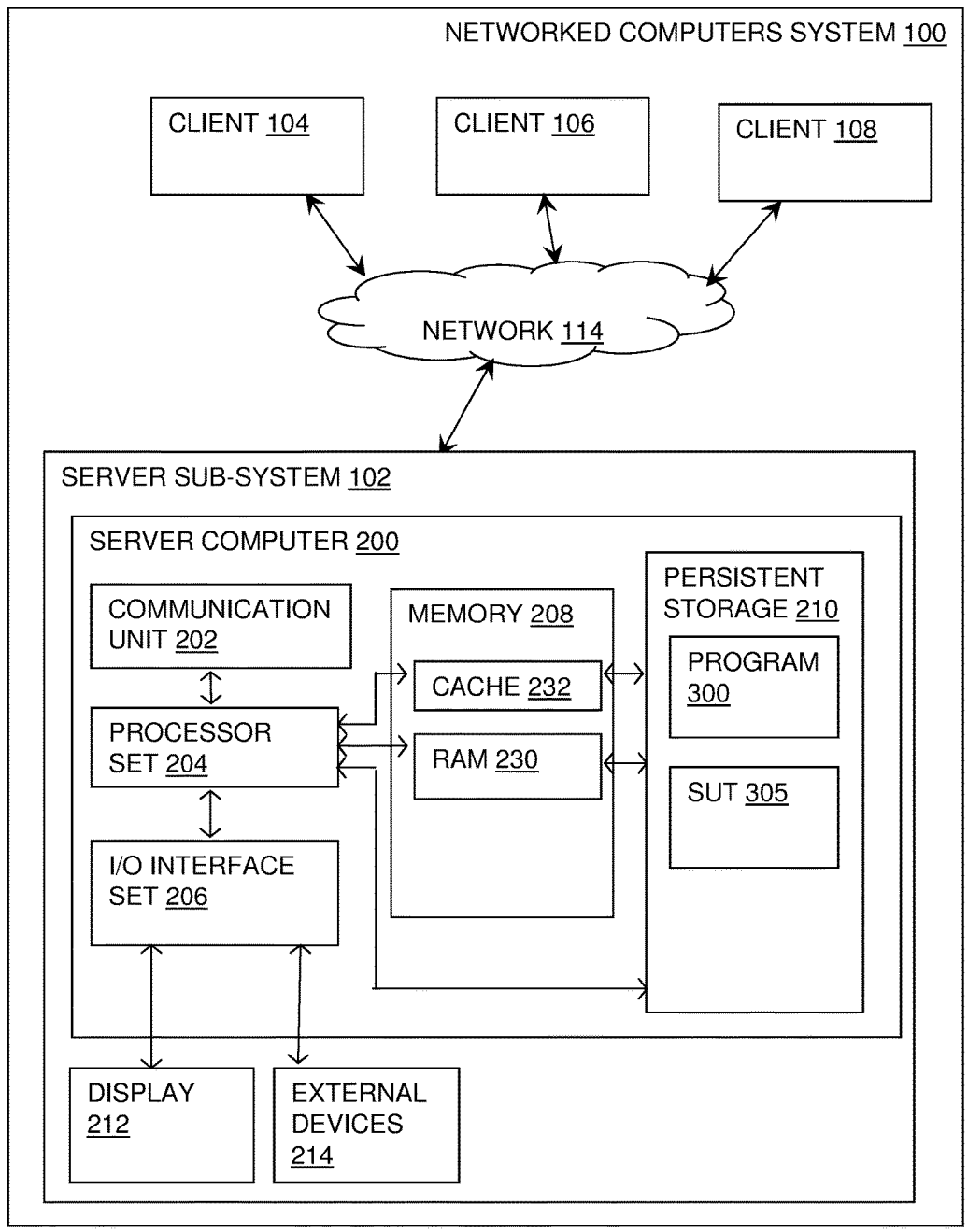
FIG. 1 is a block diagram view of a first embodiment of a system according to the present invention.

Some embodiments of the present invention check dynamically generated output of a running program for spelling, grammar, and/or other usage errors. Such errors may then be flagged for subsequent review that may in turn lead to potential program updates.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, and 108; communication network 114; server computer 200; communication unit 202; processor set 204; input/output (110) interface set 206; memory device 208; persistent storage device 210; display device 212; external device set 214; random access memory (RAM) devices 230; cache memory device 232; program 300; and software-under-test (SUT) 305.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
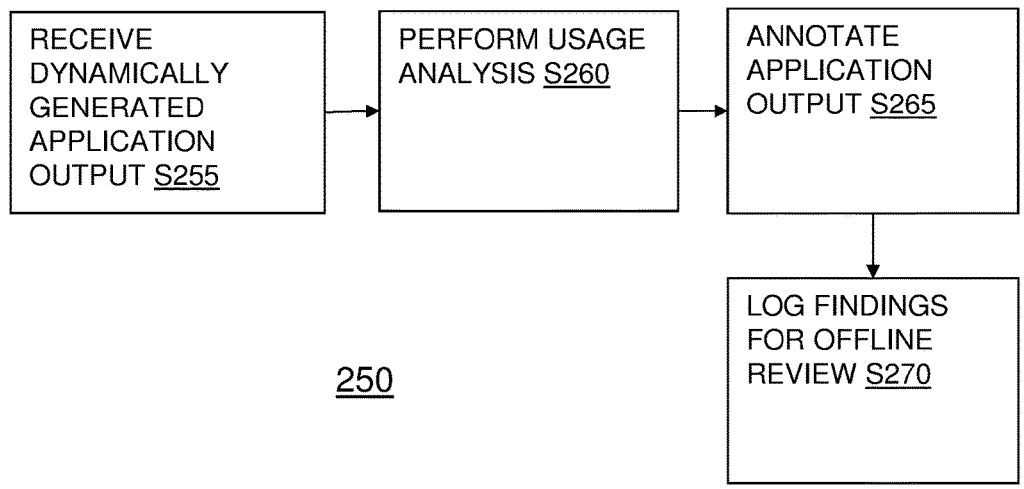
FIG. 2 is a flowchart showing a first embodiment method performed, at least in part, by the first embodiment system.
Figure 3:
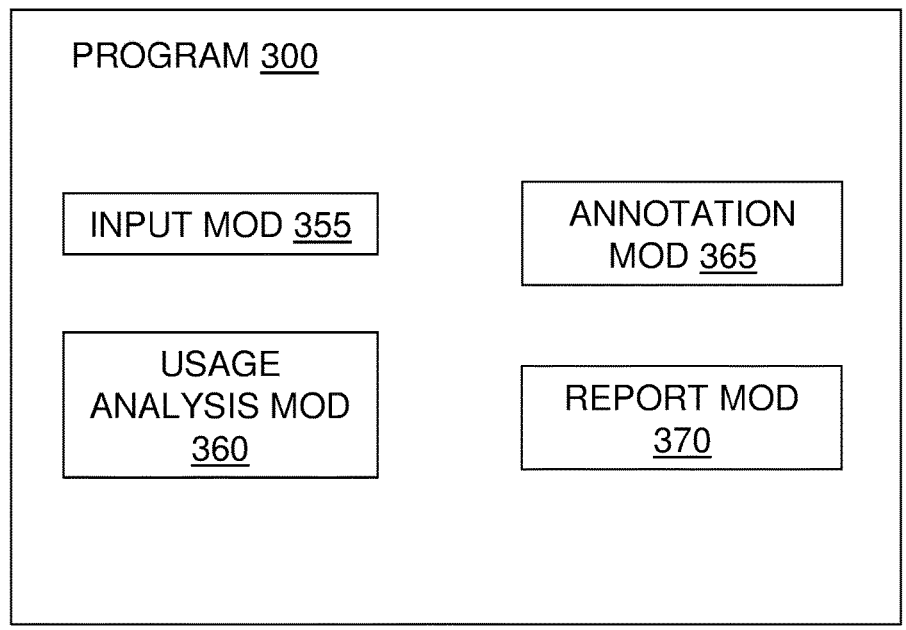
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks), FIG. 3 (for the software blocks), and other Figures as indicated throughout.

Processing begins at step S255, where, as software-under-test (SUT) 305 executes (see FIG. 1), input module ("mod") 355 receives textual output dynamically generated by SUT 305 (see FIG. 1). In this embodiment, SUT 305 is an end-user application specifically being tested by a user from client 104. Alternatively, the SUT may be running elsewhere or in multiple locations, may be tested post-deployment rather than (or in addition to) being tested during a dedicated testing phase, may be a type of software other than an end-user application, and/or may generate output in other modalities, such as aural. Likewise, the output here consists of discrete user messages, but alternatively might include other types of output, such as a continuous text stream. More generally still, the output may be any assembly of component parts that are not statically assigned in a predetermined configuration or with predetermined content, but rather are generated and/or configured dynamically by the SUT as it runs in response to its runtime context, such as user interaction, server query responses, data file contents, and so forth. Architecturally, program 300 runs separately from SUT 305, but in other embodiments may be integrated with it, such as via a special debug build of the SUT and/or via a plug-in for the integrated development environment (IDE) in which SUT 305 is being developed.

Processing proceeds to step S260, where usage analysis mod 360 checks the SUT-generated output for proper spelling and grammar. In general, any usage checking algorithms may be used that are consistent with operational constraints. Similarly, the checking performed by these algorithms may cover any number of usage factors, including but not necessarily limited to: spelling, grammar, punctuation, style, contextual appropriateness, clarity (whether independent or in context), consistency, and/or meaning. Usage may also include usage of other output elements, such as graphics, containers, widgets, and so forth, as they are dynamically combined during program execution.

Performing the usage analysis in real time as SUT 305 runs permits contextual checking that extends beyond the boundaries of the dynamically generated output per se. For example, given the output message "She doesn't seem to know where she is going," usage analysis mod 360 could query SUT 305 (such as through a special API) to determine to whom the pronoun 'she' refers. A response indicating that 'she' refers to the user, who previously entered the name 'Mike' when prompted for a username by SUT 305, might cause usage analysis mod 360 to identify this usage error that would otherwise have been missed.

Processing proceeds to step S265, where annotation mod 365 annotates the output from SUT 355 with the findings from usage analysis mod 360, then forwards the annotated output on to the original output target screen display for real-time consumption. Alternatively, annotated output is forwarded to a different destination even as the original output is forwarded to the original target display, or annotations are provided in or supplemented by information presented through a different modality, such as aural. This step is optional and may be done either in conjunction with or instead of step S270.

Processing proceeds to step S270, where report mod 370 logs information about the output and the findings of usage analysis mod 360 for offline review and archiving. This step is optional and may be done either in conjunction with or instead of step S265. In this way, dynamically generated messages that cannot be checked ahead of time can nevertheless be automatically checked during SUT execution, and this approach offloads some of the work that might otherwise require greater attention from a human tester.

Figure 4A:
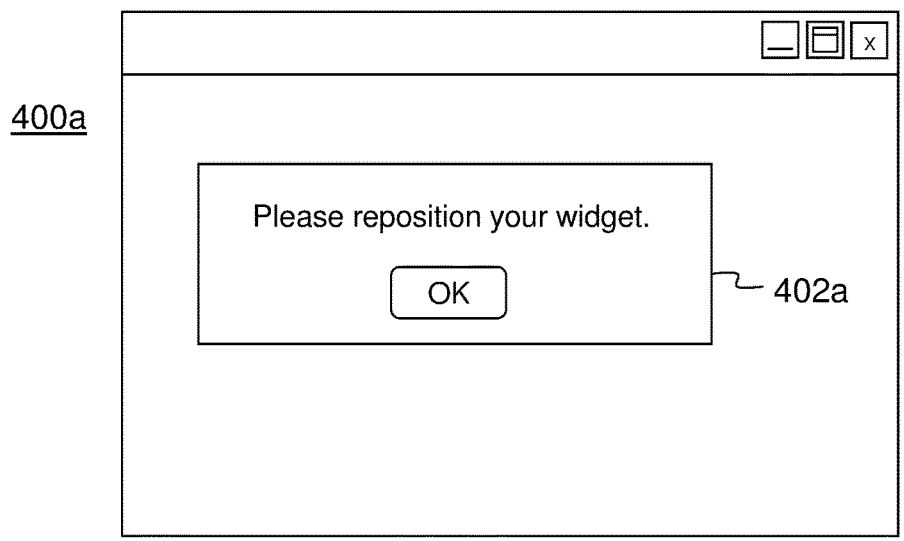
FIG. 4A is a first screenshot view showing information that is generated by and/or helpful in understanding embodiments of the present invention.
Figure 4B:
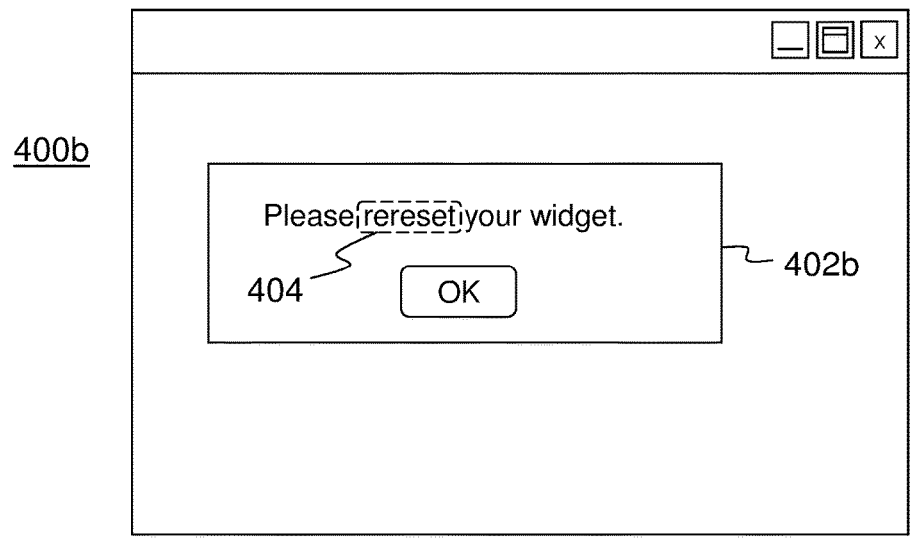
FIG. 4B is a second screenshot view showing information that is generated by and/or helpful in understanding embodiments of the present invention.

Screenshots 400*a* and 400*b* of FIGS. 4A and 4B, respectively, show an example of this process in action. Screenshot 400*a* contains SUT output message 402*a*. This message is not a statically stored message, but rather is generated by the SUT at runtime from the components it contains. One of these components is the prefix "re-", which is pre-pended to verbs to indicate the selected action must be performed again. In message 402*a*, the action that must be redone is "position." Usage analysis mod 360 finds no problems with the word "reposition" nor any of the reset of this dynamically generated output message, so the output is passed to the screen unannotated, as shown.

In contrast, under different conditions, the SUT uses this same formula to generate output message 402*b* of screenshot 400*b*, but in this case it produces a non-word, "rereset." Usage analysis mod 360 discovers this spelling mistake and creates annotation 404 that it outputs with the original message. In some embodiments, a suggested solution may also be supplied. Armed with this information, a user can decide what action, if any, should be taken with respect to the SUT program to correct the SUT-generated usage error.

Figure 5A:
FIG. 5A is a third screenshot view showing information that is generated by and/or helpful in understanding embodiments of the present invention.
Figure 5B:
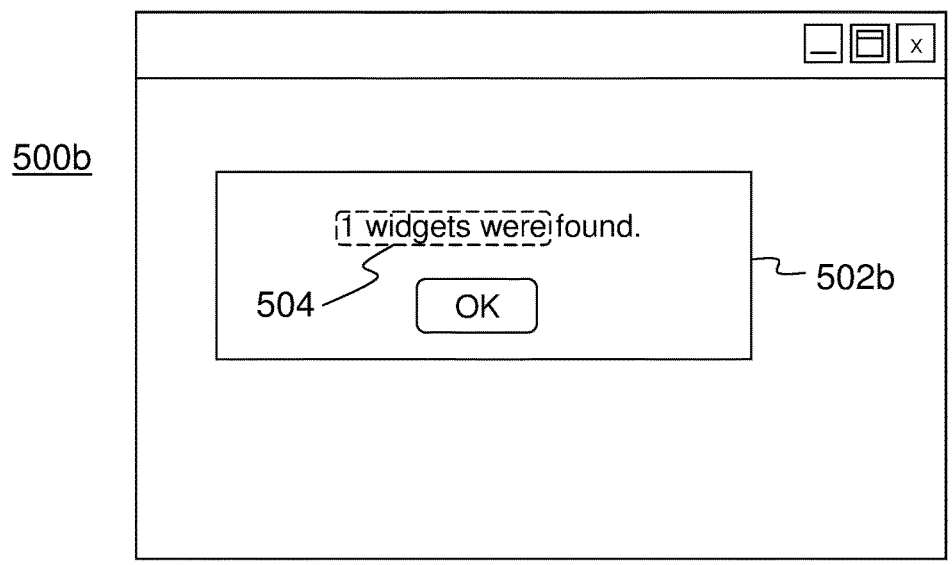
FIG. 5B is a fourth screenshot view showing information that is generated by and/or helpful in understanding embodiments of the present invention.

A second example is shown in screenshots 500*a* and 500*b* of FIGS. 5A and 5B, respectively. These screenshots show messages 502*a* and 502*b*, dynamically generated according to the formula "number of objects found" followed by "object name" followed by the fixed phrase "were found." Usage analysis mod 360 finds no problems with message 502*a*, so this message is passed to the output display unannotated, as shown.

On the other hand, under different conditions, the SUT generates message 502*b*. This message is ungrammatical, perhaps because the SUT programmer never anticipated a condition where only 1 object of interest is found. Usage analysis mod 360 detects this grammar issue and annotates the output message so that, as in the previous example, a user can decide what action, if any, should be taken with respect to the SUT program to correct the SUT-generated usage error.

III. Further Comments and/or Embodiments

Some embodiments of the present invention recognize that parts of some messages that will be shown on a screen during program execution are dynamic and are evaluated in real time as a result of program run-time characteristics such as: (i) if/else statement branch selection; (ii) server responses; (iii) system responses; (iv) specific runtime errors that may result in a crash; (v) dynamic logic; and/or (vi) object-oriented designs and frameworks. For instance, message prefixes, postfixes, and/or other fixed blocks of text are often reused to create new messages in real time through various combinations of these blocks of text with new, dynamically generated text and/or with each other during program execution. Owing to the dynamic nature of their run-time generation, these messages are not accessible while programming the mobile or desktop applications from which they arise.

Moreover, some embodiments of the present invention recognize: (i) that spell checkers are conventionally embedded inside integrated development environments (IDEs) used by developers when writing program code; (ii) that as a result, these spell checkers can catch some spell checking errors before the code is packaged and turned over to quality assurance professionals; but (iii) that dynamic messages do not fully avail themselves to analysis by such development-time spell checkers.

Still further, some embodiments of the present invention recognize that although quality assurance professionals may look for spelling errors when testing an application, they may also be trying to test other aspects of program correctness in addition to spell checking, especially functional correctness. They may also be looking at other message characteristics such as reasonability/usability and/or proper globalization (for example, effective translations from English to German). As a result, these professionals may be distracted by these other tasks from focusing on spelling errors. In addition, they are typically not technical writers, nor are they as likely to find pronunciation or spelling errors as are automated spell checkers.

In recognition of the above, some embodiments of the present invention include a special running mode (such as an "extended debug mode" version of the conventional "debug mode") that performs spell checking during runtime for every message and/or line of text that is generated by the program and appears on the screen. Any problem found during dynamic spell checking is marked on the screen, and/or the problem, together with one or more suggestions for how to fix it, is entered in a special report that is output to the file system immediately after ending the running of the application in this special mode. Messages with spell checking errors that appear and disappear from the screen so quickly that the tester/developer doesn't get a chance to properly review them will be preserved in the report for later review. This approach is a significant improvement over the conventional quality assurance process for such issues. If a quality assurance period is, for example, one or two months long, an application program can be tested for its messages and dynamic messages, not only for its functionality, during this whole period and/or during functionality testing.

Figure 6A:
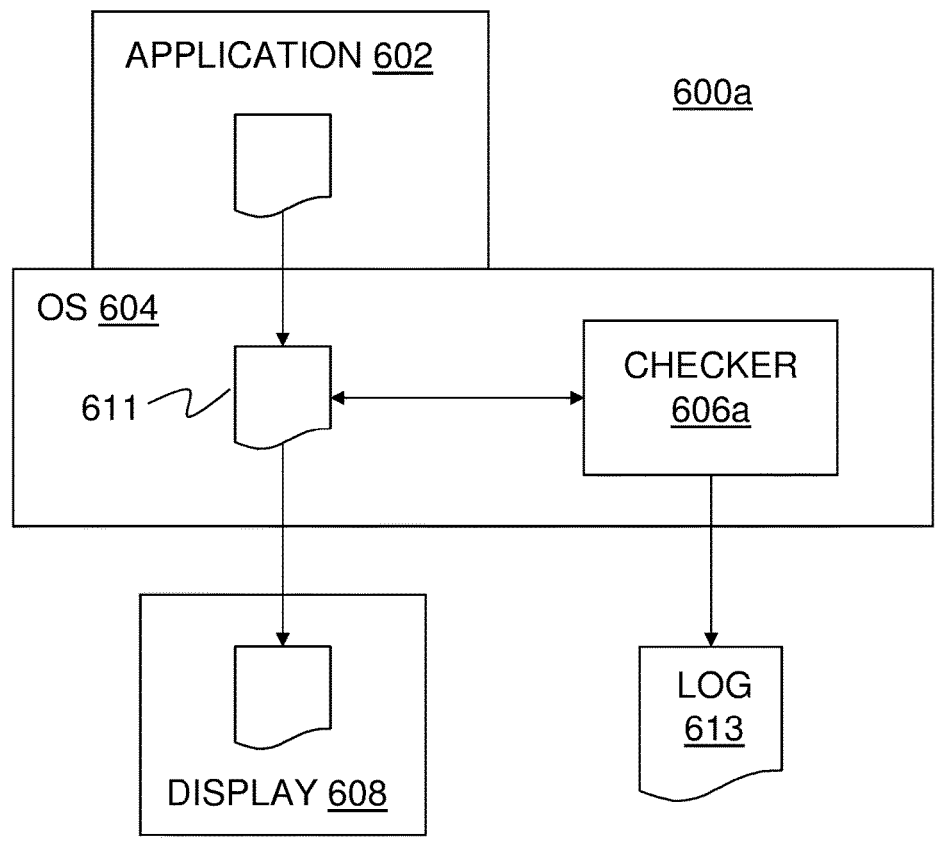
FIG. 6A is a block diagram view of a second embodiment system.

Shown in FIG. 6A is diagram 600*a*, illustrating one example implementation architecture. Diagram 600*a* includes: application 602; operating system 604; spell checker 606a; display device (screen) 608; text 611; and report (log) 613. In this embodiment, the spell checker is implemented as an intervention in the runtime library of the operating system (or virtual machine) using an extension of its runtime code. As it runs, application 602 dynamically produces text 611. It passes this text to operating system 604 to be output to display device 608. Operating system 604 optionally runs text 611 through spell checker 606a as part of this process, and spell checker annotates text 611 with any error findings it makes before outputting it to display device 608, also recording this information in report 613.

Figure 6B:
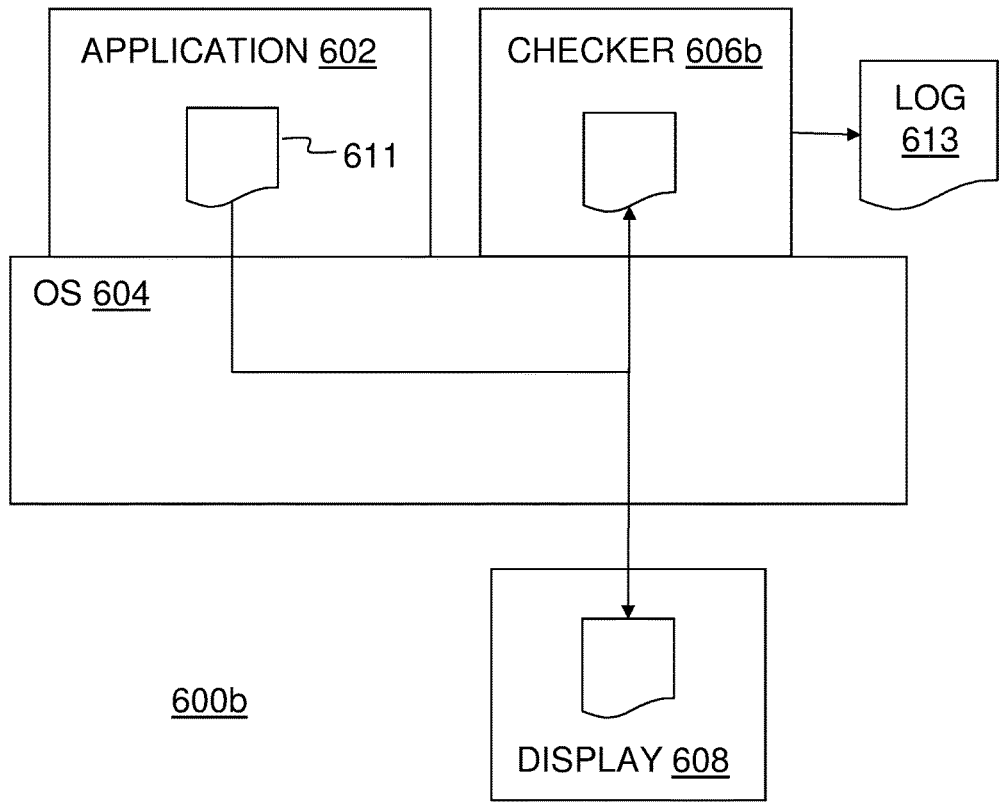
FIG. 6B is a block diagram view of a third embodiment system.

An alternative architecture is shown in diagram 600b of FIG. 6B. Diagram 600b includes the same elements as diagram 600a, except spell checker 606a is replaced by spell checker 606b. Instead of an operating system extension, spell checker 606b is implemented using a special library/packages that are added to the user interface programmer code (included) and, in this case, launched to run in the background. While the application is running, spell checker 606b sniffs everything going out to the screen, done here using extended paint( )-type functions. Alternatively, the spell checker may not be launched as a separate thread, or it may be running in a background thread and using runtime code of the specific programming language of the application to analyze at every interval what is printed to the screen.

Some embodiments of the present invention may include one, or more, of the following features, characteristics and/or advantages: (i) perform spell checks for all visual components in an application; (ii) perform dynamic checks on application texts; (iii) perform real-time spell checking of a desktop and/or mobile user interface application while the application is running; (iv) check the same element for dynamic changes based on the environment and/or the logical behavior of the application; and/or (v) create a report so suggestions can be checked at a later time.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers, in each case regardless of functional role (such as end user, tester, developer, evaluator, quality assurance reviewer, and so on).

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Dynamically generated output: any assembly of component parts that are not statically assigned in a predetermined configuration or with predetermined content, but rather are generated and/or configured dynamically by executable code as it runs in response to its runtime context, such as user interaction, server query responses, data file contents, and so forth; the output does not exist in monolithic literal form, such as in a string repository, prior to run time; a simple text example is "Found 6 occurrences of 'dog'" as generated from the parameterized string "Found [number] occurrences of '[search object]'", where [search object] is replaced at run time by the name of the object searched and [number] is replaced by the number of instances found; a more sophisticated example would be a sentence of (pseudo) natural language generated by an artificial intelligence in response to a user question.

Usage error: errors in usage of a natural or formal language, including but not necessarily limited to: spelling, grammar, punctuation, style, contextual appropriateness, clarity (whether independent or in context), consistency, and/or meaning; also includes errors in usage of other user interface elements, such as icons or other graphics, containers, and/or widgets.

Debug build: a version of a program containing extra code not instrumental to enabling the program's normal function, but that instead contains additional information for use in program debugging (such as symbolic linking for tying executing instructions to lines of high-level language code), or that is used to obtain additional information about the program that would not otherwise be directly available (such as by collecting conditional branch coverage for auditable coverage verification purposes); a debug build is not necessarily exclusive of a release build.

What is claimed is:

1. A method comprising:
receiving output dynamically generated by an executing program, with the output including an assembly of component parts generated and/or configured by the executing program as it runs;
usage checking the output for usage errors in real time via a debug build of the executing program, with the usage checking performed during run time of the executing program on every line of text as the line of text appears on a display to detect at least a first usage error; and
responsive to detection of the first usage error, providing notice of the error to a user, with the provision of notice including:
annotating the output substantially simultaneously with generation of the output by the executing program to provide a first annotation indicative of the first usage error, and creating a record of the first usage error in a manner so that the usage record persists beyond termination of the executing program.

\* \* \* \* \*